C. P. LANDRETH.
METHOD OF AND APPARATUS FOR TREATING SEWAGE.
APPLICATION FILED JAN. 11, 1917.
1,364,387.
Patented Jan. 4, 1921.
2 SHEETS—SHEET 1.
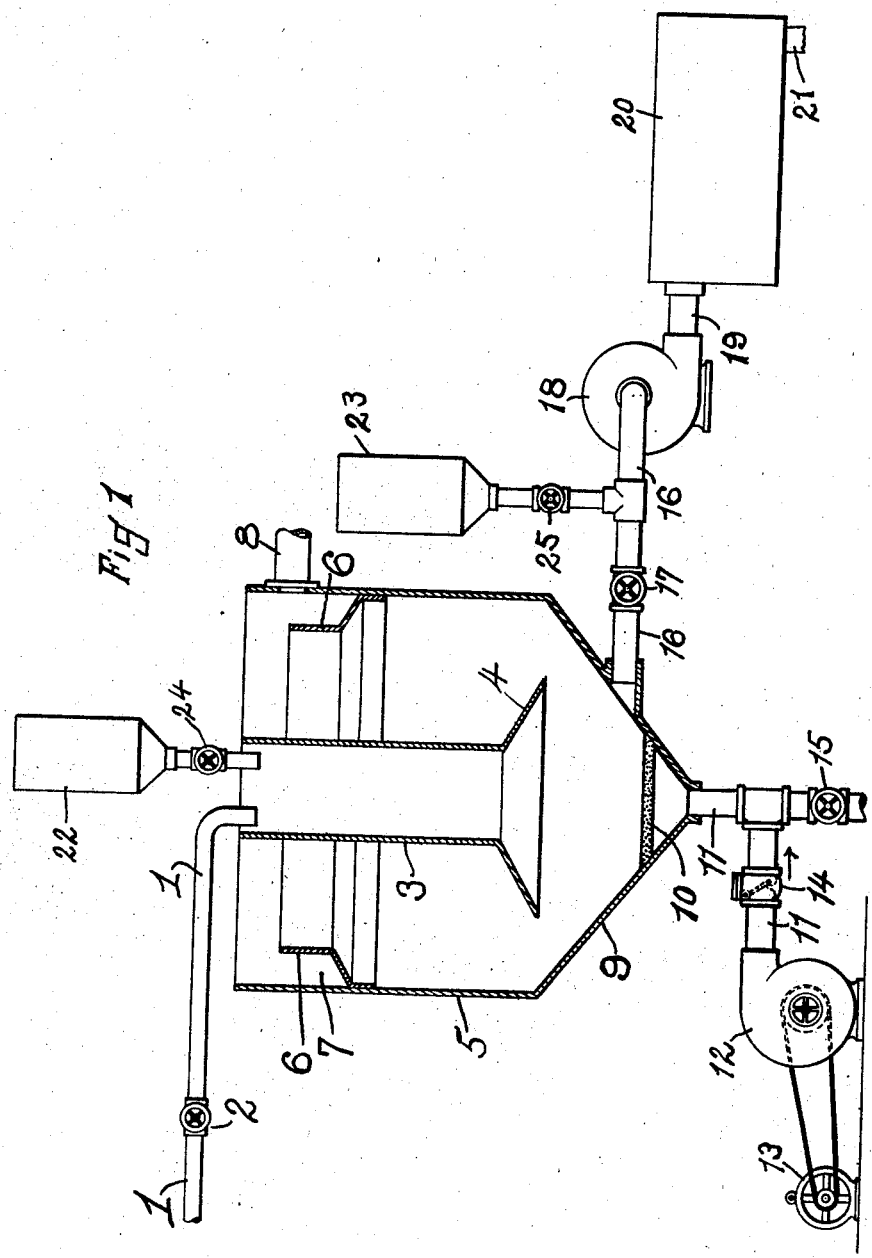
Inventor
Clarence P. Landreth
By Cornelius D. Ehret
his Attorney

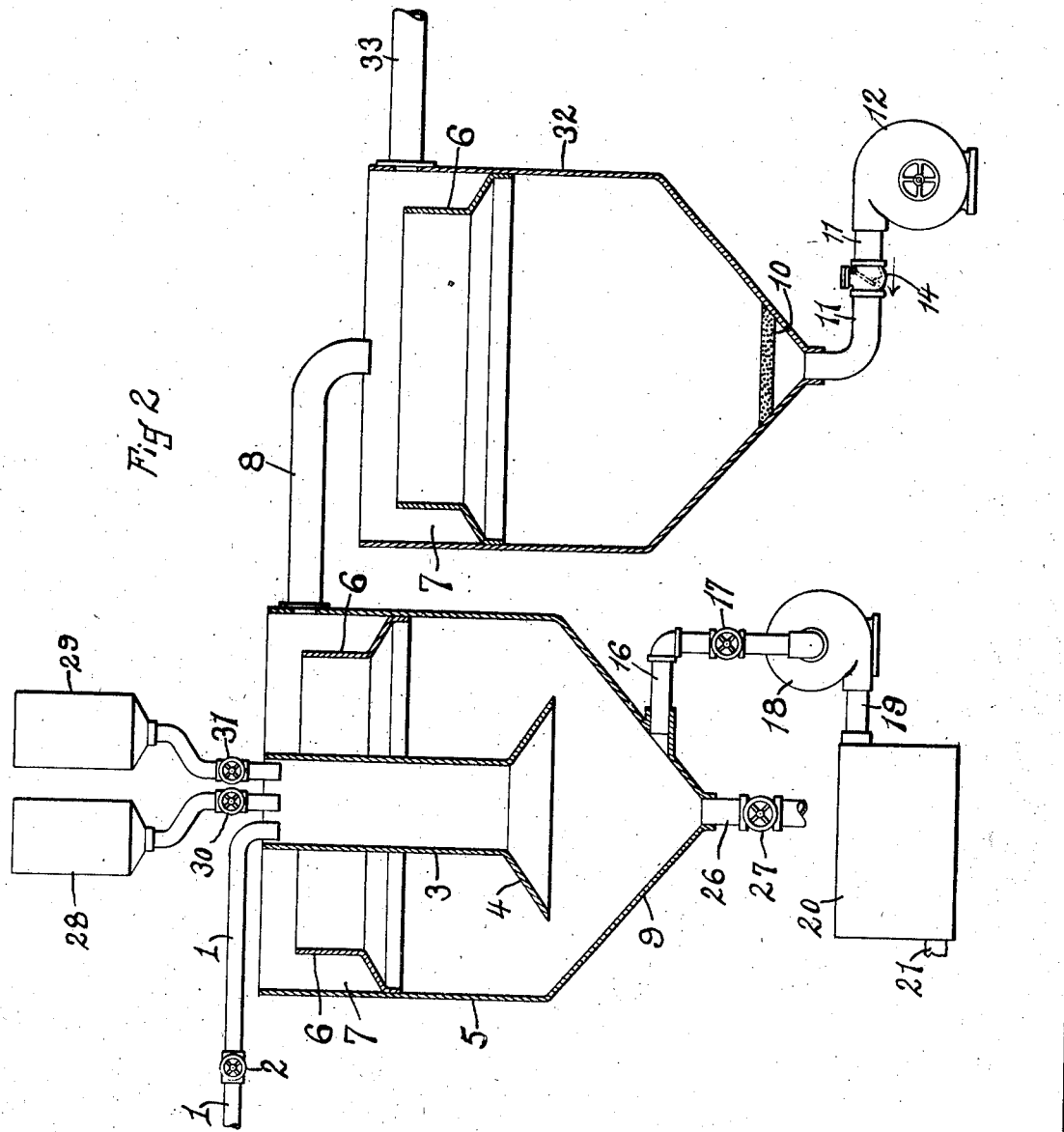

UNITED STATES PATENT OFFICE.

CLARENCE P. LANDRETH, OF PHILADELPHIA, PENNSYLVANIA.

METHOD OF AND APPARATUS FOR TREATING SEWAGE.

1,364,387.  Specification of Letters Patent.  Patented Jan. 4, 1921.

Application filed January 11, 1917. Serial No. 141,753.

*To all whom it may concern:*

Be it known that I, CLARENCE P. LANDRETH, a citizen of the United States, residing in the city of Philadelphia, county of Philadelphia and State of Pennsylvania, have invented certain new and useful Improvements in Methods of and Apparatus for Treating Sewage, of which the following is a specification.

My invention relates to a method of and apparatus for treating sewage or other liquid for the purpose of removing matter in suspension therein and for rendering such suspended matter less offensive as to odor and to put it into condition in which it can be readily pressed or dried; and for the purpose of clarifying the liquid and rendering it more or less free from harmful bacteria.

My invention resides in the method of treating sewage or other liquid by aerating the same, as by blowing air therethrough in a state of fine subdivision, and simultaneously introducing a material which will chemically react with contents of the sewage or liquid to produce a precipitate having coagulating or sedimentizing properties for separating from the liquid the solid or semi-solid matter in suspension therein.

My invention resides also in aerating the sewage or liquid and previous to, during, or after aeration introducing finely divided solid material, generally chemically inert with respect to the sewage or liquid, for the purpose of putting the separated or sedimentized sludge or solids into a condition in which it may be rapidly dewatered, rendered less slimy, and put into condition for more effective and rapid filter pressing or drying, the added material constituting a filtering medium which in the treatment of the sludge in a filter press or the like builds up a filtering layer or surface which will retain the solids or semi-solids while permitting the contained water or liquid readily to pass through.

My invention resides also in aerating the sewage or liquid and introducing into the same a germicide.

Any of the aforementioned treatments may be practised independently or in conjunction with each other.

My invention resides also in apparatus for carrying out the above-mentioned methods.

For an understanding of my process, and an illustration of some of the forms of the apparatus which may be employed, reference is to be had to the accompanying drawings, in which:

Figure 1 is a side elevational view, some parts in vertical section, of apparatus which may be employed for carrying out my invention.

Fig. 2 is a side elevational view, partly in vertical section, of a modified form of apparatus.

Referring to Fig. 1, a pipe 1, controlled by the valve 2, delivers the liquid or sewage to be treated into the compartment formed by the cylindrical or otherwise shaped member 3 having at its bottom the conical outlet 4 delivering into the interior of the tank 5 having near its top the cylindrical partition or weir 6 over the upper edge of which the liquid flows into the compartment 7 from which it flows through the effluent pipe 8. The tank 5 may have the conical bottom 9 on which may rest the member 10, of porous earthenware, or which may consist of any suitable member having numerous and small perforations. Beneath the member 10 the pipe 11 connects with the interior of the tank 5, the pipe 11 communicating with the discharge outlet of the centrifugal or other air pump 12 driven by any suitable source of power, as for example, the electric motor 13. In the pipe 11 is disposed a valve 14 which will allow passage of air from the pump 12 but will prevent flow of liquid backwardly to the pump. Through a valve 15 the liquid in the pipe 11 and the bottom of the tank 5 may be drawn off.

Communicating with the interior of the tank 5 at or near its bottom is a pipe 16, controlled by valve 17, communicating with the intake of the sludge pump 18 which may be of the centrifugal or any other suitable type, the pump 18 delivering through pipe 19 to the filter press or other receiver 20. In lieu of a filter press 20 filter beds may be employed or any other means for separating from the solids or semi-solids of the sludge the liquid entrained therewith. In the example illustrated, the liquid separated from the sludge in the device 20 may be drawn off through the pipe 21. Tanks 22 and 23 are adapted to contain liquid, or solid material, or a mixture of liquid and solid material, to be introduced through valves 24 and 25 into the compartment 3 and pipe 16, respectively.

The raw sewage or liquid is introduced through the pipe 1 into the compartment 3, from which it flows into the surrounding space in the tank 5. Air is blown by the pump 12 through the member 10 in finely divided state, the finely divided air passing upwardly through the liquid or sewage, aerating the same. Milk of lime, contained in the tank 22, is admitted through the valve 24 into the compartment 3, where it becomes admixed with the liquid or sewage under treatment and reacts with contents of the liquid or sewage to produce calcium carbonate or other precipitate which coagulates and sedimentizes the solids and semi-solids which gather at the bottom of the tank 5 and are withdrawn by the pump 18 and delivered to the filter press 20 where the entrained liquid is separated therefrom.

In lieu of milk of lime, sodium hydroxid or any other suitable reagent may be employed.

Where the nature of the solids and semi-solids in the liquid or sewage are such as to produce a slimy or greasy sludge, or a sludge which is with difficulty dewatered, there may be added, by introduction into the compartment 3, or from the tank 23 through the valve 25 into the pipe 16, finely divided material which may be chemically inert with respect to the contents of the liquid or sewage. Such material may be finely divided or powdered limestone or marble, which is largely calcium carbonate, or magnesium carbonate or any other suitable finely divided material such as fullers' earth, fine sand, asbestos, kieselguhr, etc., for increasing the porosity of the sludge and for acting as a filtering medium either in a filter press or filter bed, whereby the sludge is more readily and rapidly dewatered and dried. Of the aforementioned substances limestone is preferred, though any of the others may be used singly or in any suitable mixture with the other or others.

The addition of such finely divided material will not interfere with the bacterial action or oxidation incident to the aeration, but will materially aid in supplying a filtering medium in a filter press or filter beds by building up a surface or layer in the filter which while holding back the solids and semi-solids of the sludge will permit the liquid or water readily to pass through. Such added material is of further advantage in that it causes the drying sludge in which it is contained to separate and form numerous fissures, which admit air and so facilitate the drying, where drying is sought.

Where magnesium or calcium carbonate is introduced as above described and removed with the sludge, when the sludge and such calcium or magnesium content is spread upon soil for fertilizer purposes, these carbonates, or either of them, will neutralize acids resulting from decomposition of the sludge, and form calcium or magnesium bicarbonates or other compounds of calcium or magnesium.

Into the compartment 3, or into the pipe 16 from the tank 23, or both, may be introduced a germicide, such as ferric hydroxid, calcium hypochlorite, chlorin gas in solution, or any other suitable germicide, which renders the sludge less noxious and of less offensive odor without, however, materially reducing its fertilizer value. And where the germicide is introduced into the compartment 3, besides affecting the sludge as above described, will beneficially affect the effluent by destroying or inhibiting various forms of bacterial life, if desired.

While the semi-solids or solids are withdrawn from the bottom of the tank 5 as sludge, with resultant clarification of the remaining liquid, that remaining liquid rises and passes over the upper edge of the partition 6 into the compartment 7 from which it passes out through the pipe 8 as clarified effluent.

In Fig. 2 the liquid or sewage is introduced from pipe 1 into the chamber 3, through whose lower end it passes into the tank 5, through the bottom 9 of which communicates the pipe 26 having the valve 27 through which the contents of the tank 5 may be drawn off as for cleaning or washing purposes, or for otherwise disposing of the sludge formed therein. The pipe 16, controlled by valve 17, communicates with the intake of the sludge pump 18 which delivers through pipe 19 to the filter press, filter bed, or other drying or dewatering apparatus 20. The tanks 28 and 29 are adapted to deliver material through their valves 30 and 31 into the compartment 3. The liquid from tank 5 passes over the upper edge of the partition 6 into the compartment 7, from which it passes out through the pipe 8 and delivers into a second tank 32 which may have the partition 6 forming the compartment 7 from which liquid flows out through the pipe 33. In the bottom of the tank 32 is a member 10 of the character hereinbefore described, with the under side of which communicates the pipe 11 communicating with the air pump 12 and having the valve 14.

The tank 28 may contain milk of lime or other suitable reagent, such as a hydroxid, as sodium or other hydroxid, which is introduced through the valve 30 into the compartment 3. This material reacts with contents of the sewage, as before described, to form a precipitate which acts as a coagulant to assist or hasten sedimentation of the solids or semi-solids to form a sludge which settles in the bottom of the tank 5 and is withdrawn therefrom by the sludge pump and delivered to the filter press or filter bed 20.

There may also be introduced into the compartment 3 a germicide of the character hereinbefore referred to, from tank 29 through valve 31.

After this treatment of the liquid or sewage to produce a coagulant or by germicide, or both, the clarified liquid rises upwardly, passes over the partition 6 into the chamber 7, from which it flows through the pipe 8 into the second tank 32 where the clarified effluent is aerated by the air blown therethrough in finely divided state. The liquid rises in this tank and flows over the partition 6 into the compartment 7 and flows away through the effluent pipe 33.

Whether or not introducing coagulant-forming reagent from tank 28 or germicide from tank 29, material, such as finely divided limestone or the like, hereinbefore described, may be introduced into the liquid or sewage in the first tank 5 to become intermingled with and carried off with the sludge and assist with the filtering and drying thereof as hereinbefore described.

What I claim is:

1. The method of treating liquid or sewage, which consists in passing air therethrough, introducing a reagent forming with contents of the liquid or sewage a sedimentizing precipitate, sedimentizing the suspended matter to form a sludge, withdrawing the sludge and admixing therewith finely divided material, and thereafter dewatering the sludge.

2. The method of treating liquid or sewage, which consists in passing air therethrough, introducing a reagent forming with contents of the liquid or sewage a sedimentizing precipitate, sedimentizing the suspended matter to form a sludge, withdrawing the sludge and adding thereto a germicide and finely divided material, and thereafter dewatering the sludge.

3. Liquid or sewage treating apparatus comprising a treating tank, means for aerating the liquid or sewage in said tank, sludge-dewatering means, a connection from said treating tank to said last named means, and a second tank communicating with said connection.

4. Liquid or sewage treating apparatus comprising a treating and sedimentizing tank, sludge-dewatering means, a connection from said tank to said means, and means for introducing finely divided material into said connection.

5. The method of treating sewage or liquid containing impurities including suspended matter, which consists in introducing into the same calcium hydroxid reacting with contents thereof to produce a sedimentizing precipitate, sedimentizing the suspended matter by said precipitate and drawing off the clarified liquid.

6. The method of treating sewage or similar waste liquid, which consists in blowing air therethrough in the presence of calcium hydroxid added thereto, the air blowing agitating the sewage or liquid to facilitate reaction of said calcium hydroxid with contents thereof to produce a sedimentizing precipitate and oxidizing an ingredient of the sewage or liquid, and sedimentizing and separately drawing off the clarified liquid and resultant sludge.

In testimony whereof I have hereunto affixed my signature this 10th day of January, 1917.

CLARENCE P. LANDRETH.